United States Patent [19]

Hatke et al.

[11] Patent Number: 5,610,253

[45] Date of Patent: Mar. 11, 1997

[54] CYCLOOLEFIN POLYMERS

[75] Inventors: Wilfried Hatke, Hofheim; Frank Osan, Kelkheim, both of Germany

[73] Assignee: Hoechst Aktiengesellschaft, Frankfurt am Main, Germany

[21] Appl. No.: 501,263

[22] Filed: Jul. 11, 1995

[30] Foreign Application Priority Data

Jul. 13, 1994 [DE] Germany .......................... 44 25 408.3

[51] Int. Cl.$^6$ .................................................. C08F 232/08
[52] U.S. Cl. ........................ 526/281; 526/160; 526/308; 526/348; 526/348.6; 526/283; 526/943
[58] Field of Search .................................... 526/283, 308, 526/160, 281, 943

[56] References Cited

U.S. PATENT DOCUMENTS

| 3,884,888 | 5/1975 | Collette | 526/28 |
| 4,614,778 | 9/1986 | Kajiura et al. | 526/281 |
| 4,969,741 | 11/1990 | Kennedy et al. | 356/338 |
| 5,003,019 | 3/1991 | Ishimaru | 526/281 |
| 5,087,677 | 2/1992 | Brekner | 526/160 |
| 5,179,171 | 1/1993 | Minami et al. | 525/288 |
| 5,229,022 | 7/1993 | Song et al. | 252/56 R |

FOREIGN PATENT DOCUMENTS

| 0156464A1 | 10/1985 | European Pat. Off. . |
| 0203799A1 | 12/1986 | European Pat. Off. . |
| 0407870A2 | 1/1991 | European Pat. Off. . |
| 0441548A1 | 8/1991 | European Pat. Off. . |
| 2421838A1 | 1/1975 | Germany . |
| 4030399A1 | 4/1992 | Germany . |
| 957105 | 5/1964 | United Kingdom . |
| WO93/24539 | 12/1993 | WIPO . |

*Primary Examiner*—Fred Zitomer
*Attorney, Agent, or Firm*—John M. Genova

[57] ABSTRACT

The present invention relates to a cycloolefin polymer having a solution viscosity <0.25 dl/g, comprising polymerized units of at least one cycloolefin and, if desired, polymerized units of one or more acyclic olefins, wherein the cycloolefin polymer has at one or both ends an olefinically unsaturated group having at least 3 carbon atoms.

5 Claims, No Drawings

CYCLOOLEFIN POLYMERS

The invention relates to cycloolefin polymers (COPs) having terminal olefinically unsaturated groups and a solution viscosity (VN, eta) <0.25 dl/g (at 135° C. in decalin in accordance with DIN 53728) and also functionalized cycloolefin polymers and block copolymers derived therefrom and to processes for preparing these polymers.

Thermoplastic cycloolefin polymers are described in the literature (EP 203 799, EP 283 164, DE 2421838, EP 156 464, EP 407 870). They have a series of technologically important properties such as low water absorption, high dimensional stability on heating, high moduli of elasticity and hydrolyric resistance. However, they are difficult to mix with other materials, in particular polymers, and have poor adhesion properties. In addition, they are difficult to functionalize.

EP 441 548-A describes the preparation of copolymers having terminal olefinically unsaturated end groups by copolymerization of ethylene and alpha-olefins having up to 18 carbon atoms using Ziegler/Natta catalysts. WO 911488, DE 4030399 and WO 9324539 describe the preparation of homopolymers and copolymers having olefinically unsaturated end groups by polymerization of ethylene and alpha-olefins using metallocene catalysts. Pure polypropylene oligomers having various end groups are described in DE 4030399. The polymers known hitherto and having terminal, olefinically unsaturated groups are usually oils or waxes having low melting points which can be used in functionalized form as dispersants in fuels and motor oils, as viscosity index modifiers or as emulsifiers.

It is therefore an object of the invention to find a polymer which avoids the disadvantages of the prior art.

The present invention accordingly provides a cycloolefin polymer having a solution viscosity <0.25 dl/g, comprising polymerized units of at least one cycloolefin and, if desired, polymerized units of one or more acyclic olefins, wherein the cycloolefin polymer has at one or both ends an olefinically unsaturated group having at least 3 carbon atoms.

The cycloolefin polymer of the invention preferably has an olefinically unsaturated end group at one end. The cycloolefin polymer comprises polymerized units of at least one polycyclic olefin and preferably also polymerized units of at least one acyclic olefin. The terminal olefinically unsaturated group having at least 3 carbon atoms preferably has the formula I

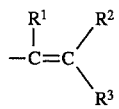  (I)

where $R^1$, $R^2$ $R^3$ are identical or different and are each a hydrogen atom, a hydrocarbon radical or a halogenated hydrocarbon radical, e.g. $C_1$–$C_{16}$-alkyl, $C_1$–$C_{16}$-aryl, $C_{14}$–$C_{16}$-alkenyl, $C_1$–$C_{16}$-haloalkyl or $C_1$–$C_{16}$-haloaryl. Furthermore, two of the radicals $R^1$, $R^2$ and $R^3$ can be connected to form a ring. The $C_1$–$C_{16}$-alkyl radical or $C_1$–$C_{16}$-haloalkyl radical can be linear, branched or cyclic. The $C_1$–$C_{16}$-aryl radical can be substituted or unsubstituted. Particular preference is given to linear $C_1$–$C_8$-alkyl radicals.

The olefinically unsaturated group having at least 3 carbon atoms is particularly preferably derived from propylene, 1-butene, 1-pentene, 1-hexene, 1-heptene or 1-octene.

Preference is given to cycloolefin polymers comprising 0.1–100 % by weight, preferably 0.1–99 % by weight, based on the total mass of the cycloolefin polymer, of polymerized units of at least one polycyclic olefin of the formula II, III, IV, V, VI or VII

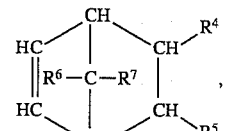

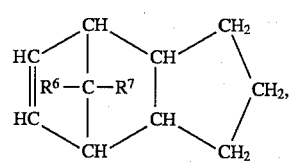

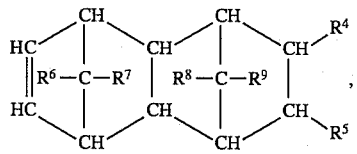

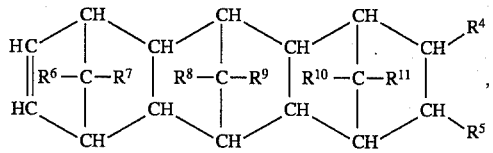

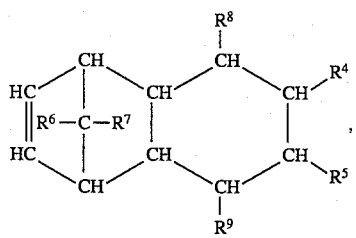

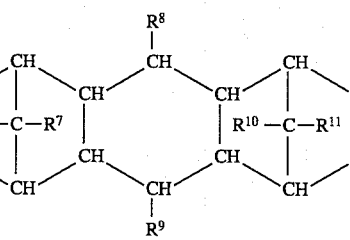

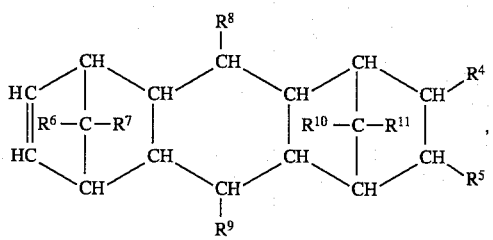

where $R^4$, $R^5$, $R^6$, $R^7$, $R^8$, $R^9$, $R^{10}$ and $R^{11}$ are identical or different and are each a hydrogen atom or a $C_1$–$C_{30}$-hydrocarbon radical, e.g. a linear or branched $C_1$–$C_8$-alkyl radical, $C_6$–$C_{18}$-aryl radical, $C_7$–$C_{20}$-alkylenearyl radical or a cyclic or acyclic $C_2$–$C_{20}$-alkenyl radical, or two or more radicals $R^4$ to $R^{11}$ are cyclically connected, where identical radicals in the various formulae can have different meanings, from 0 to 45% by weight, based on the total mass of the cycloolefin polymer, of polymerized units of at least one monocyclic olefin of the formula VIII

  (VIII)

where n is a number from 2 to 10, from 0 to 99% by weight, based on the total mass of the cycloolefin polymer, of polymerized units of an acyclic olefin of the formula IX

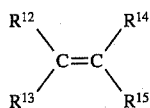

where

R$^{12}$, R$^{13}$, R$^{14}$, R$^{15}$ are identical or different and are each a hydrogen atom or C$_1$–C$_{10}$-hydrocarbon radical, a C$_1$–C$_8$-alkyl radical or C$_6$–C$_{14}$-aryl radical, and an olefinically unsaturated end group having at least 3 carbon atoms.

The cycloolefin polymers preferably comprise polymerized units of at least one polycyclic olefin, in particular of the formula II or IV, and an acyclic olefin of the formula IX which preferably has 2–20 carbon atoms, in particular ethylene.

Preference is given to cycloolefin polymers comprising polymerized units of polycyclic olefins having a norbornene base structure, particularly preferably norbornene or tetracyclododecene. Preference is also given to cycloolefin polymers comprising polymerized units of acyclic olefins such as alpha-olefins, particularly preferably ethylene. Particular preference is given to norbornene/ethylene and tetracyclododecene/ethylene copolymers having an olefinically unsaturated end group having at least 3 carbon atoms.

The proportion of polymerized units of acyclic olefins of the formula IX is from 0 to 99% by weight, preferably 5–80% by weight, particularly preferably 10–60% by weight, based on the total mass of the cycloolefin polymer.

The cycloolefin polymers of the invention having terminal olefinically unsaturated groups have glass transition temperatures between −20° C. and 400° C., preferably between 50° C. and 200° C. The viscosity number (decalin, 135° C., DIN 53728) is between 0.1 and 25 ml/g, preferably between 10 and 25 ml/g.

The cycloolefin polymers of the invention are amorphous polyolefins having a high transparency and high dimensional stabilities on heating and narrow molecular weight distributions. They can be used for optical components such as lenses, disks, covers and glasses. Furthermore, they are suitable as starting materials for the preparation of COPs having terminal polar functional groups, without gelling occurring during the functionalizations.

The present invention also provides a process for preparing a cycloolefin polymer having a solution viscosity <0.25 dl/g in the presence of a transition metal catalyst, which comprises reacting at least one cycloolefin and, if desired, one or more acyclic olefins with less than 25 mol%, based on the total amount of monomers, of an olefin having at least 3 carbon atoms which is different from the acyclic olefin(s) and the cycloolefin(s).

It has been found that addition of olefins having at least 3 carbon atoms during the polymerization of cycloolefin polymers using transition metal compounds in the presence of a cocatalyst allows cycloolefin polymers having olefinically unsaturated end groups to be synthesized, and that the selection of the concentration ratio of the olefin having at least 3 carbon atoms to the cycloolefin monomers allows the molecular weights of the cycloolefin polymers to be set in a targeted manner.

Owing to the molecular-weight-regulating action, the olefins having at least 3 carbon atoms will hereinafter be referred to as regulators.

Suitable regulators are linear or branched C$_3$–C$_{18}$-olefins such as propylene, butene, isobutylene, pentene, hexene, heptene, octene, 4-methylpentene, butadiene, isoprene, or cyclic olefins such as cyclopentene, cyclohexene, vinylcyclohexane, vinylnorbornene, vinylcyclohexene, cyclopentadiene, dicyclopentadiene, styrene or α-methylstyrene.

For preparing the cycloolefin polymers within the meaning of the invention, the regulator is initially charged in the monomer mixture before the polymerization is started. The regulators are introduced into the monomer mixture in the desired concentration. In the case of the gaseous olefins, the concentration can be set by setting the partial pressure at the respective temperature. The concentration of the liquid olefins can be set simply by addition of the appropriate amount. The concentrations of the regulators are between 0.001 mol and 1.5 mol, preferably between 0.01 and 1 mol, per liter of the monomer solution. After addition of the polymerization-active catalyst, the polymerization can be continued as is described for cycloolefin polymers in EP 203 799, EP 283 164, DE 2421838, EP 156 464 or EP 407 870, which are hereby expressly incorporated by reference. The polymerization can be carried out continuously or batchwise.

The regulator consumed in the polymerization can be further metered in continuously during the polymerization. The polymerization activities of the metallocene catalysts used are generally not impaired by the addition of the regulators. For low concentrations, an increase in the polymerization activities can even be observed. This behavior is of particular interest for the economical preparation of the cycloolefin polymers having olefinically unsaturated terminal groups.

The process of the invention operates at temperatures of from −78° to 150° C. and a pressure of from 0.01 to 64 bar, in the presence of one or more catalysts comprising at least one cocatalyst and at least one transition metal compound. Such catalyst systems are described in, for example, EP 203 799, EP 283 164, P 43 04 309.7, P 43 04 308.9 or DE 2421838, which are hereby expressly incorporated by reference. Preference is given to metallocene-aluminoxane catalyst systems.

Examples of transition metal compounds used are:

rac-dimethylsilylbis(1-indenyl)zirconium dichloride, rac-dimethylgermylbis(1-indenyl)zirconium dichloride, rac-phenylmethylsilylbis(1-indenyl)zirconium dichloride, rac-phenylvinylsilylbis(1-indenyl)zirconium dichloride, 1-silacyclobutylbis(1-indenyl)zirconium dichloride, rac-diphenylsilylbis(1-indenyl)hafnium dichloride, rac-phenylmethylsilylbis(1-indenyl)hafnium dichloride, rac-diphenylsilylbis(1-indenyl)zirconium dichloride, rac-ethylene-1,2-bis(1-indenyl)zirconium dichloride, dimethylsilyl(9-fluorenyl)(cyclopentadienyl)zirconium dichloride, diphenylsilyl(9-fluorenyl)(cyclopentadienyl)zirconium dichloride, bis(1-indenyl)zirconium dichloride, diphenylmethylene(9-fluorenyl)cyclopentadienylzirconium dichloride, isopropylene(9-fluorenyl)cyclopentadienylzirconium dichloride, phenylmethylmethylene(9-fluorenyl)cyclopentadienylzirconium dichloride, isopropylene(9-fluorenyl)(1-(3-isopropyl)cyclopentadienyl)zirconium dichloride, isopropylene(9-fluorenyl)(1-(3-methyl)cyclopentadienyl)zirconium dichloride, diphenylmethylene(9-fluorenyl)(1-(3-methyl)cyclopentadienyl)zirconium dichloride, methylphenylmethylene(9-fluorenyl)(1-(3-methyl)cyclopentadienyl)zirconium dichloride, dimethylsilyl(9-fluorenyl)(1-(3-methyl)cyclopentadienyl)zirconium dichloride, diphenylsilyl(9-fluorenyl)(1-(3-methyl)cyclopentadienyl)zirconium dichloride, diphenylmethylene(9-fluorenyl)(1-(3-tertbutyl)cyclopentadienyl)zirconium dichloride, isopropylene(9-fluorenyl)(1-(3-tertbutyl)cyclopentadienyl)zirconium dichloride, isopropylene(cyclopentadienyl)(1-indenyl)zirconium dichloride, diphenylcarbonyl(cyclopentadienyl)(1-indenyl)zirconium dichloride, dimethylsilyl(cyclopentadienyl)(1-indenyl)zirconium dichloride, isopropylene(methylcyclopentadienyl)(1-indenyl)zirconium dichloride, isopropylenebis(1-indenyl)zirconium dichloride, 4-($\eta^5$-cyclopentadienyl) -4,7,7-trimethyl-($\eta^5$-4,5,6,7-tetrahydroindenyl)zirconium dichloride and analogous hafnocenes, titanium tetrachloride, $VOCl_3$, $VOCl_2(OCH_3)$, $VOCl_2(OC_2H_5)$ and $VOCl(OC_2H_5)_2$.

A further aspect of the invention is functionalized cycloolefin polymers having a solution viscosity <0.25 dl/g, comprising polymerized units of at least one cycloolefin and, if desired, polymerized units of one or more acyclic olefins, wherein the cycloolefin polymer bears at one or both ends a terminal functional group different from olefinically unsaturated end groups.

The terminal functional group preferably has the formula X

where $R^{16}$ and R17 can be identical or different and are each a hydrogen radical, an aliphatic or aromatic $C_1$–$C_{30}$-hydrocarbon radical, a carboxylic anhydride, a silyl or siloxane radical, an oxygen radical, I, Br, CN, Cl, F, OH, OR', OCOR', COOH, COR, COOR', $NH_2$, NHR', $NR'_2$, SOH, $SO_2H$, $SO_3H$, SOR', $SO_2R'$ or $SO_3R'$, where R' is an aliphatic or aromatic $C_1$–$C_{20}$-hydrocarbon radical, and Y is a group

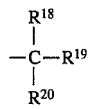

where $R^{18}$, $R^{19}$ and $R^{20}$ can be identical or different and are each a hydrogen radical, an aliphatic or aromatic $C_1$–$C_{30}$-hydrocarbon radical, a carboxylic acid anhydride, a silyl or siloxane radical, an oxygen radical, I, Br, CN, Cl, F, OH, OR", OCOR", COOH, COOR", $NH_2$, NHR", $NR"_2$, SOH, $SO_2H$, $SO_3H$, SOR", $SO_2R"$ or $SO_3R"$, where R" is an aliphatic or aromatic $C_1$–$C_{20}$-hydrocarbon radical, or the two radicals $R^{16}$ and $R^{18}$ are replaced by an oxygen atom to give an epoxide.

Two or more of the radicals R16-$R^{20}$ can also be cyclically connected to one another.

Particularly preferred radicals are $R^{16}$, $R^{17}$, $R^{18}$, $R^{19}$ and $R^{20}$ are hydroxy, alkoxy, aryloxy, amino, halo, imino, thio, ester, thioester, carboxylic acid, ketone, amide, carboxylic anhydride, carboxylate and epoxide end groups.

Preference is given to cycloolefin polymers having those terminal functional groups different from olefinically unsaturated end groups which are obtainable by a polymeranalogous reaction of the cycloolefin polymers of the invention having at one or both ends olefinically unsaturated groups having at least 3 carbon atoms.

The state of development of organic synthesis offers numerous reactions for this purpose(Advanced Organic Chemistry, Jerry March, Verlag John Wiley & Sons, New York 1985, pages 657–779 or Organikum, VEB Deutscher Verlag der Wissenschaften, Berlin 1986, which are hereby both expressly incorporated by reference). In the following, some examples of reactions are described:

Molecular addition of hydrogen halides and halogens enables cycloolefin polymers having terminal halogens to be obtained. Molecular addition of water makes the direct introduction of hydroxy groups possible. Hydroxy groups can also be introduced at the chain end of the cycloclefin polymer by hydroboridation/oxidation. Nucleophilic substitution of the halogens allows hydroxy, alkoxy, aryloxy, amino, imino, thio, cyano or alkyl and aryl Groups to be introduced. Cycloolefin polymers having epoxide end groups are made possible by reactions with, for example, peracids. Ene-maleination allows anhydride groups to be introduced. Reactions of the OH-terminated cycloolefin polymers make possible a multiplicity of further compounds such as, for example, esters of carboxylic, mineral and sulfonic acids and silyl esters. The molecular addition of the hydrogen halides or halogens can be carried out even at room temperature or lower temperatures with substantial exclusion of light. Thus, the molecular addition of bromine can be carried out at 10° C. and in decalin as solvent. The reaction proceeds quantitatively, as can be seen by the disappearance of the olefinic protons in the $^1$H-NMR.

The cycloolefin polymers of the invention having terminal functionalized groups different from olefinically unsaturated end groups have glass transition temperatures between –20° C. and 400° C., preferably between 50° C. and 200° C. The viscosity number (decalin, 135° C., DIN 53728) is between 0.1 and 25 ml/g, preferably between 10 and 25 ml/G.

COPs having terminal functional groups can be used as additives in polymers. COPs having terminal functional groups allow the surface properties of nonpolar polymers to be modified and thus, for example, the printability and adhesion properties to be improved. COPs having terminal functional groups can be used as polymeric emulsifiers for improving the phase adhesion in polymer blends. Reaction of the functional group with a component of the blend enables the phase adhesion to be further optimized. In another application, the COPs having terminal functional groups can be used as viscosity modifiers or flow improvers for petroleum products, mineral oils and similar systems.

A further aspect of the invention is block copolymers comprising blocks of the functionalized cycloolefin polymers of the invention. The block copolymers can be diblock, triblock, multiblock or star-block copolymers or graft copolymers.

Cycloolefin-polymer block copolymers within the meaning of the invention comprise at least one block of the functionalized cycloolefin polymers of the invention and at least one block of a polymer or copolymer different from COP. These polymers or copolymers different from COP can be amorphous or partially crystalline polymers. Preference is given to amorphous polymers or copolymers having glass transitions in the range from −100° to 150° C. Examples of such polymers are polystyrene, polysiloxanes, polyoxytetramethylene, polybutadiene, polyisoprene, polyacrylates, polymethacrylates, poly(styrene-co-butadiene), poly(styrene-co-isoprene).

The diblock, triblock and branched multiblock copolymers can be prepared by suitable coupling methods from cycloolefin polymers having terminal functionalized groups different from olefinically unsaturated end groups. The molecular weights of the polymer blocks different from COP are in the range of $10^4$–$10^6$ g/mol, preferably $10^4$–$10^5$ g/mol. The absolute molecular weights $M_w$ of the cycloolefin polymer blocks are in the range from 2,000 to 10,000 g/mol, preferably from 5,000 to 10,000 g/mol. The polydispersity $M_w/M_n$ of the block copolymers is in the range of 1–10, preferably in the range of 1–5 and particularly preferably in the range of 1–3.

The cycloolefin-polymer block copolymers of the invention can be prepared, for example, by coupling with anionically polymerized polymers and copolymers. The reaction of cycloolefin polymers possessing substitutable halogens at the chain end with anions results in replacement of the halogen by the anion. This reaction can be utilized for coupling halogenated cycloolefin polymer with the polymerization-active anions as occur in the anionic polymerization. This enables the preparation of block copolymers of cycloolefin polymers and monomers which can undergo an anionic polymerization. Examples of anionically polymerizable monomers are vinylaromatics such as styrene, alpha-methylstyrenes, methylstyrenes, dimethylstyrene, vinylnaphthalene, conjugated dienes such as isoprene, butadiene and acrylate and methacrylate monomers such as, for example, methyl methacrylate, methyl ethylacrylate, methyl propylacrylate, methyl acrylate, ethyl acrylate, propyl acrylates, butyl acrylates, pentyl acrylates, hexyl acrylates and higher homologs, cyclohexyl acrylates and substituted cyclohexyl acrylates.

A further aspect of the preparation of block copolymers comprising blocks of cylcoolefin polymers and anionically preparable polymers is the reaction of cycloolefin polymer having terminal bromine radicals and the anions of, for example, polybutadiene, polyisoprene or polystyrene. The cycloolefin polymer having terminal double bonds is dissolved in a solvent which is relatively inert to bromine and anions under the reaction conditions, for example carbon tetrachloride or decalin, and slowly reacted at temperatures of from −30° to 50° C. with a solution of bromine in the solvent used for the reaction in such a way that always only a part of the amount of bromine required for complete bromination is added. This procedure is continued until the intrinsic color of the bromine solution is retained in the reaction solution over a relatively long period of time(5–60 minutes). The preparation of polybutadiene, polyisoprene or polystyrene by anionic polymerization is carried out using known methods as are described in, for example, *Advances in Polymer Science* 56, *Springer Verlag Berlin* (1984). The polymer solution which still contains the anionic chain ends is, after completion of the bromination, added at temperatures of from −30° to 20° C. to the cycloolefin polymer solution. Subsequently the mixture is allowed to warm to room temperature and the solution is left stirring for some further time at temperatures of from 20° to 100° C. A further aspect of the preparation of cycloolefin-polymer block copolymers is the coupling via condensation processes.

Cycloolefin polymers having terminal hydroxy, amino or anhydride groups can be connected to polymers containing, for example, terminal acid, acid chloride, dialkylsilyl halide, dialkylsilylamino or amino end groups to give block copolymers.

Graft copolymers are obtainable by copolymerization of cycloolefin polymers having an appropriate functionalization and one or more suitable monomers. Thus, cycloolefin polymers having methacryloyl or styryl end groups can be reacted with free-radical-polymerizable monomers to give graft copolymers. The methacryloyl or styryl end groups can be introduced into the cycloolefin polymer by reaction of cycloolefin polymers having, for example, terminal hydroxy or amino end groups with methacryloyl chloride and 4-vinylbenzoyl chloride or 4-vinylbenzyl chloride.

The property spectrum of the block copolymers depends on the proportions and properties of the polymers and copolymers combined with the cycloolefin copolymers. The range can extend from thermoplastic elastomers to brittle thermoplastics. The combination of a cycloolefin polymer as matrix with a polymer having a low glass transition temperature($T_g$) such as polybutadiene leads to an impact-toughened polymer. The mixing of such a block copolymer into unmodified cycloolefin polymers likewise increases the impact toughness.

Further applications of such block copolymers are improvement of the phase adhesion and miscibility of cycloolefin polymers and other polymers. Mixing block copolymers having, for example, polar blocks into cycloolefin polymers allows the surface of these polymers to be modified and thus the adhesion to other materials to be improved. This is very important for printing, painting and varnishing or metallizing. Further applications of such block copolymers are emulsifiers, viscosity modifiers and flow improvers.

EXAMPLE 1

A 1.5 dm³ reactor was charged with 1 liter of a petroleum fraction (boiling range: 90°–110° C.) and 20 ml of methylaluminoxane solution in toluene(10.1% by weight of methylaluminoxane having a molecular mass of 1,300 g/mol according to cryoscopic determination) and the mixture was stirred at 70° C. for about 30 minutes to remove any impurities present. After draining the solution, the reactor was charged with 470 cm³ of an 85% strength by weight solution of norbornene in toluene and with 30 cm³ of 1-octene. This solution was saturated with ethylene by multiple pressurization with ethylene(6 bar G) and 10 cm³ of the methylaluminoxane solution in toluene was subsequently added to the reactor and the mixture was stirred for 5 minutes at 70° C. A solution of 4.72 mg of isopropylene(1-cyclopentadienyl)(1-indenyl)zirconium dichloride in 10 cm³ of methylaluminoxane solution in toluene was added after preactivation for 15 minutes. Polymerization was carried out while stirring (750 rpm) for 30 minutes at 70° C., with the ethylene pressure being maintained at 6 bar G by metering in further amounts. The homogeneous reaction solution was drained into a vessel and admixed with about 1 ml of water. The solution is subsequently admixed with a filter aid and filtered through a pressure filter. This solution is quickly poured into 5 dm³ of acetate, stirred for 10 minutes and filtered. The solid obtained was washed with acetone. The polymer again filtered off was dried at 80° C. and a pressure of 0.2 bar for 15 hours.

This gave 26.4 g of a colorless polymer. The viscosity number was determined in decalin in accordance with DIN 53728. The solution was measured at 135° C. in a capillary viscometer. The viscosity number was 20.8 ml/g. The glass transition temperatures were determined using a DSC7 from Perkin Elmer. The glass transition temperature was determined at a heating rate of 20° C./min from the 2nd heating curve and was 172° C. The content of unsaturated double bonds was determined by means of nuclear magnetic resonance spectroscopy. The ratio of the intensities of olefinic protons to aliphatic protons was 0.089%. The molecular weight of the polymer was determined at 135° C. in ortho-dichlorobenzene by means of gel permeation chromatography. Polyethylene fractions were used as standards. The following values were found for the polymer: $M_n$: 4,800 g/mol, $M_w$: 10,400 g/mol, $M_w/M_n$: 2.2.

EXAMPLES 2–5

The procedure was similar to that of Example 1. Various amounts of 1-octene were used. Table 1 summarizes the experimental parameters. The analytical data of the polymers are described in Table 2.

TABLE 1

| Ex. | Catalyst | Amount of catalyst mg | Pressure bar | 1-octene ml | Monomer solution ml | Reaction time min. | Yield g |
| --- | --- | --- | --- | --- | --- | --- | --- |
| 2 | 1 | 5.29 | 6 | 60 | 440 | 30 | 45.2 |
| 3 | 1 | 4.93 | 6 | 100 | 400 | 30 | 44.5 |
| 4 | 2 | 0.96 | 12 | 100 | 400 | 60 | 22.2 |
| 5 | 3 | 10 | 6 | 120 | 2,880 | 60 | 750 |

Catalyst 1: isopropylene(1-cyclopentadienyl)(1-indenyl)zirconium dichloride
Catalyst 2: isopropylenebis(1-indenyl)zirconium dichloride
Catalyst 3: 4-($\eta^5$-cyclopentadienyl)-4,7,7-trimethyl($\eta^5$-4,5,6,7-tetrahydroindenyl)zirconium dichloride

TABLE 2

| Ex. | Viscosity number ml/g | Mw g/mol | $M_n$ g/mol | $M_w/M_n$ | Olefinic protons % | $T_g$ °C. |
| --- | --- | --- | --- | --- | --- | --- |
| 2 | 14.1 | 5,400 | 2,600 | 2.08 | 0.17 | 147 |
| 3 | 12.1 | 3,800 | 2,100 | 1.81 | 0.25 | 127 |
| 4 | 16.0 | 11,000 | 5,900 | 1.86 | 0.17 | 107 |
| 5 | 10.1 | 8,400 | 4,400 | 1.90 | 0.10 | 209 |

COMPARATIVE EXAMPLE 1

The experiment described in Example 1 was repeated under the same conditions, but in this experiment no octene was added in the polymerization of the cycloolefin polymer. This gave 40.9 g of a white powder. The analysis of the material gave: VN=62.7 ml/g, $T_g$=184° C., $M_w$=48,400 g/mol, $M_n$=15,500 g/mol, $M_w/M_n$=3.13. The $^1$H-NMR spectrum of the polymer shows no olefinic protons.

COMPARATIVE EXAMPLE 2

The experiment described in Example 4 was repeated under the same conditions, but in this experiment no octene was added in the polymerization of the cycloolefin polymer. This gave 18.9 g of a white powder. The analysis of the material gave: VN=172.2 ml/g, $T_g$=153° C., $M_w$-165,000 g/mol, $M_n$=47,000 g/mol, $M_w/M_n$=3.5. The $^1$H-NMR spectrum of the polymer shows no olefinic protons.

COMPARATIVE EXAMPLE 3

The experiment described in Example 5 was repeated under the same conditions, but in this experiment no octene was added in the polymerization of the cycloolefin polymer. Data: 147 g, VN=25.2 ml/g, $T_g$=223° C., $M_w$=24,000 g/mol, $M_n$=11,300 g/mol, no olefinic protons.

EXAMPLE 6

10 g of the cycloolefin polymer from Example 3 are dissolved in 100 ml of dry decalin and cooled to from 0 to 10° C.

A solution of 1 ml of bromine and 20 ml of decalin is subsequently slowly added dropwise with substantial exclusion of light to the cycloolefin polymer solution until the solution retains the intrinsic color of the bromine for 15 minutes. The consumption of bromine solution is 1 ml. The polymer is precipitated in acetone, filtered off, washed a number of times with acetone and dried. This gives 10.2 g of a white powder. The elemental analysis gives a bromine content of 2.9%. No olefinic protons are detected in the $^1$H-NMR.

COMPARATIVE EXAMPLE 4

10 g of the cycloolefin polymer from Comparative Example 1 were admixed with bromine solution as described under Example 6. The consumption of bromine solution is less than 0.1 ml. This gives 9.9 g of a white powder. The elemental analysis gives a bromine content of <0.1%.

EXAMPLE 7

10 g of the cycloolefin polymer described under Example 3 are dissolved in a mixture of 100 ml of dry tetrahydrofuran and 100 ml of dry toluene and cooled to 10° C. 10 ml of a 1 molar solution of a BH$_3$/THF complex in tetrahydrofuran are subsequently added dropwise. After addition is complete, the solution is heated to 60° C. and stirred for 4 hours. The solution is cooled to 10° C. and admixed with a solution of 20 ml of 6 molar sodium hydroxide solution, 2 ml of ethanol and 10 ml of 30% strength hydrogen peroxide solution. The mixture is subsequently stirred for a further 2 hours at room temperature. The polymer is precipitated in acetone, washed with acetone and dried. This gives 9.8 g of a white powder. The $^1$H-NMR shows the disappearance of the olefinic protons and the appearance of protons at 3.8 ppm.

Synthesis of the block copolymers

EXAMPLE 8

Solution 1:

3.0 g of the cycloolefin polymer from Example 1 are dissolved, under a blanket of argon, in 40 ml of dry decalin in a baked-out 500 ml four-neck flask. While stirring and with substantial exclusion of light, a solution of 0.5 ml of bromine and 5 ml of hexane is slowly added dropwise at 0°–10° C. to this solution until the brownish intrinsic color of the bromine is maintained for about 30 minutes.

Solution 2:

At the same time, in another baked-out 500 ml four-neck flask flushed with argon, 250 ml of dry decalin are titrated at a temperature of 50°–60° C. with an initiator solution comprising 2.8 ml of a 1.6 molar solution of n-butyllithium in hexane, 35 ml of decalin and 1.4 ml of dry, destabilized styrene until the intrinsic color of the styryl anion is just maintained. The decalin is subsequently cooled to 0°–10° C. and 30 ml of dry, destabilized styrene are added thereto and the mixture is titrated with initiator solution until the red intrinsic color of the styryl anion is maintained. The mixture is then heated to 50°–60° C. and 27.2 ml of the initiator solution are added. The solution is stirred for a further 30 to 60 minutes and is subsequently cooled again to 0°–10° C.

Coupling:

About 210 ml of the cold solution 2 are added via a steel needle flushed with argon to the solution 1 likewise cooled to 0°–10° C. The cooling is removed and the solution is stirred for a further 60 minutes at room temperature. The excess polystyryl anions are subsequently stopped using isopropanol and the solution is poured into acetone, the polymer is isolated and dried. This gives 3.35 g of a white powder (polymer 1). The precipitation bath is poured into 4 dm³ of methanol, the polymer is isolated and dried. This gives 17.5 g of a white powder (polymer 2). The remaining polystyrene solution is stopped using isopropanol, the polymer is precipitated in methanol and dried. This gives 7.8 g of a white powder (polymer 3).

The polymers are characterized by means of DSC and GPC (THF, 35° C., polystyrene standards):

Polymer 1: $T_g$: 102° C., 166° C. $M_n$: 35,600, $M_w$: 45,100

Polymer 2: $T_g$: 100° C. $M_n$: 20,700, $M_w$: 24,600

Polymer 3: $T_g$: 101° C. $M_n$: 16,100, $M_w$: 23,700

EXAMPLE 9

Solution 1:

11 g of the cycloolefin polymer from Example 3 are dissolved, under a blanket of argon, in 90 ml of dry decalin in a baked-out 500 ml four-neck flask. While stirring and with substantial exclusion of light, a solution of 1 ml of bromine and 10 ml of hexane is slowly added dropwise to this solution until the brownish intrinsic color of the bromine remains constant for about 30 minutes.

Solution 2:

At the same time, in another baked-out 500 ml four-neck flask flushed with argon, 250 ml of dry decalin are titrated at a temperature of 50°–60° C. with an initiator solution comprising 3.6 ml of a 1.6 molar solution of n-butyllithium in hexane, 50 ml of decalin and 1.8 ml of dry, destabilized styrene until the intrinsic color of the styryl anion is just maintained. The decalin is subsequently cooled to 0°–10° C. and 29 ml of dry, destabilized isoprene are added thereto and the mixture is titrated with initiator solution until the intrinsic color of the anion is maintained. The mixture is subsequently warmed to 15°–20° C. and 40.2 ml of the initiator solution are added. The solution is stirred for a further 30 to 60 minutes at 30° C. and cooled again to 0°–10° C.

Coupling:

About 210 ml of the cold solution 2 are added via a steel needle flushed with argon to the solution 1 likewise cooled to 0°–10° C. The cooling is removed and the solution is stirred at room temperature for a further 60 minutes. The excess anions are subsequently stopped using isopropanol and the solution is stirred into ethanol. The precipitate formed is decanted, taken up in 300 ml of THF and admixed with 450 ml of acetone. Filtration gives 8.6 g of a white powder (polymer 1). The remaining filtrate is evaporated on a rotary evaporator (polymer 2). The remainder of the polyisoprene solution is stopped using 0.5 ml of isopropanol. GPC (THF, 35° C., polystyrene standards) of the solution gives: $M_n$: 5,500 g/mol, $M_w$: 12,500 g/mol. The solution is evaporated on a rotary evaporator and the remaining residue is examined by means of DSC. A $T_g$ of –59° C. is measured.

The polymers 1 and 2 are examined by means of GPC (THF, 35° C., polystyrene standards) and DSC. This gave the following results:

polymer 1: $T_g$: 110° C.; $M_n$: 6,400 g/mol; $M_w$: 10,0.00 g/mol polymer 2: $T_g$: –57° C.; $M_n$: 6,600 g/mol; $M_w$: 15,800 g/mol

We claim:

1. A cycloolefin polymer having a solution viscosity <0.25 dl/g (at 135° C. in decalin in accordance with DIN 53 728) comprising 0.1–100% by weight, based on the total mass of the cycloolefin polymer of polymerized units of at least one polycyclic olefin of the formula II, III, IV, V, VI or VII

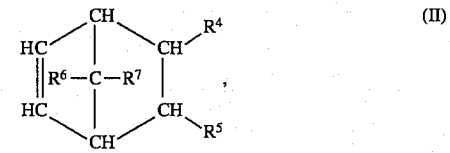

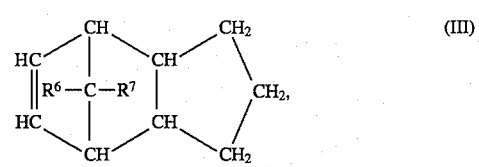

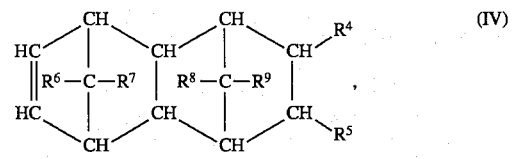

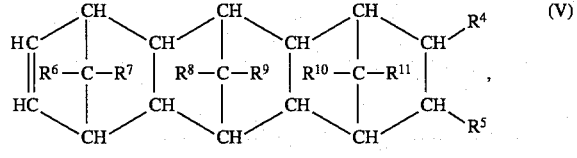

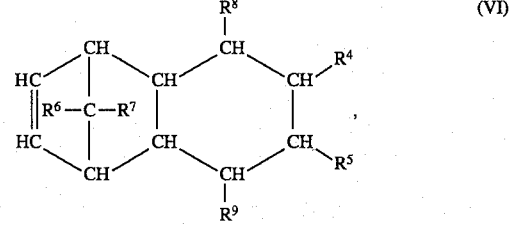

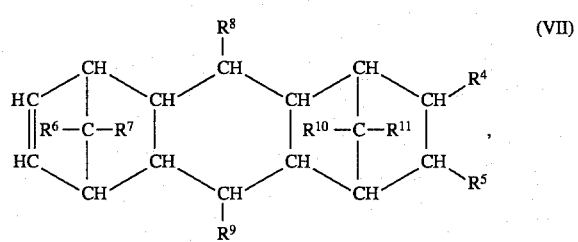

where $R^4$, $R^5$, $R^6$, $R^7$, $R^8$, $R^9$, $R^{10}$ and $R^{11}$ are identical or different and are each a hydrogen atom or a $C_1$–$C_{30}$-hydrocarbon radical or two or more radicals $R^4$ to $R^{11}$ are joined cyclically, with identical radicals in the various formulae being able to have a different meaning, from 0 to 45% by weight, based en the total mass of the cycloolefin polymer, of polymerized units of at least one monocyclic olefin of the formula VIII

where n is a number from 2 to 10, from 5 to 80% by weight, based on the total mass of the cycloolefin polymer, of polymerized units of an acyclic olefin of the formula IX

where $R^{12}$, $R^{13}$, $R^{14}$, $R^{15}$ are identical or different and are each a hydrogen atom or a $C_1$–$C_8$-alkyl or a $C_6$–$C_{14}$-aryl, wherein the cycloolefin polymer has at one or both ends an olefinically unsaturated group having at least three carbon atoms and wherein the olefinically unsaturated group is produced from an olefin that is different from the cycloolefins of the formulae II-VIII and the acyclic olefins of the formula IX and has the formula I

where any of $R^1$, $R^2$, $R^3$ can be a hydrogen, except that each of $R^1$, $R^2$, $R^3$ cannot simultaneously be hydrogen, or $R^1$, $R^2$, $R^3$ are identical or different and are each a $C_1$–$C_{16}$-alkyl, a $C_1$–$C_{16}$-aryl, a $C_1$–$C_{16}$-alkenyl, a $C_1$–$C_{16}$-haloalkyl or a $C_1$–$C_{16}$-haloaryl.

2. A cycloolefin polymer as claimed in claim 1, wherein the cycloolefin is nonbornene or tetracyclododecene and the acyclic olefin is ethylene.

3. A functionalized cycloolefin polymer having a solution viscosity <0.25 dl/g (at 135° C. in decalin in accordance with DIN 53 728) and comprising the cycloolefin polymer as claimed in claim 1, wherein the cycloolefin polymer bears at one or both ends a terminal functional group which is different from the olefinically unsaturated end group, and which has the formula X

where $R^{16}$ and $R^{17}$ are identical or different and are each a hydrogen atom, an aliphatic or aromatic $C_1$–$C_{30}$-hydrocarbon, a carboxylic acid anhydride, a silyl or siloxane, an oxygen atom, I, Br, CN, Cl, F, OH, OR', OCOR', COOH, COR, COOR', $NH_2$, NHR', $NR'_2$, SOH, $SO_2H$, $SO_3H$, SOR', $SO_2R'$ or $SO_3R'$, with R' being an aliphatic or aromatic $C_1$–$C_{20}$-hydrocarbon radical, and Y is a group

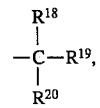

where $R^{18}$, $R^{19}$ and $R^{20}$ are identical or different and are each a hydrogen atom, an aliphatic or aromatic $C_1$–$C_{30}$-hydrocarbon radical, a carboxylic acid anhydride, a silyl or siloxane radical, an oxygen atom, I, Br, CN, Cl, F, OH, OR", OCOR", COOH, COOR", $NH_2$, NHR", $NR"_2$, SOH, $SO_2H$, $SO_3H$, SOR", $SO_2R"$ or $SO_3R"$, with R" being an aliphatic or aromatic $C_1$–$C_{20}$-hydrocarbon radical, or the two radicals $R^{16}$ and $R^{18}$ are replaced by an oxygen atom so that an epoxide is present.

4. A block copolymer comprising blocks of at least one functionalized cycloolefin polymer as claimed in claim 3.

5. A graft copolymer comprising blocks of at least one functionalized cycloolefin polymer as claimed in claim 3.

* * * * *